United States Patent
Hild (10) Patent No.: US 11,265,336 B2
(45) Date of Patent: Mar. 1, 2022

(54) DETECTING ANOMALIES IN NETWORKS

(71) Applicant: Red Hat, Inc., Raleigh, NC (US)

(72) Inventor: Marcel Hild, Kiel (DE)

(73) Assignee: Red Hat, Inc., Raleigh, NC (US)

( * ) Notice: Subject to any disclaimer, the term of this patent is extended or adjusted under 35 U.S.C. 154(b) by 421 days.

(21) Appl. No.: 16/368,281

(22) Filed: Mar. 28, 2019

(65) Prior Publication Data
US 2020/0314128 A1    Oct. 1, 2020

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1416* (2013.01)

(58) Field of Classification Search
CPC . H04L 63/1425; H04L 63/1416; G06N 20/00; G06N 20/20
USPC .......................................................... 726/1
See application file for complete search history.

(56) References Cited

U.S. PATENT DOCUMENTS

| | | | | |
|---|---|---|---|---|
| 9,332,028 | B2 * | 5/2016 | Xaypanya | H04L 63/145 |
| 10,063,575 | B2 * | 8/2018 | Vasseur | G06N 20/00 |
| 10,419,450 | B2 * | 9/2019 | Muddu | H04L 63/06 |
| 10,574,512 | B1 * | 2/2020 | Mermoud | H04L 41/0636 |
| 10,601,766 | B2 * | 3/2020 | Wackerly | H04L 63/1408 |
| 10,673,886 | B1 * | 6/2020 | Mezic | H04L 41/22 |
| 2007/0192863 | A1 * | 8/2007 | Kapoor | H04L 67/10 726/23 |
| 2008/0229415 | A1 * | 9/2008 | Kapoor | H04L 63/14 726/22 |
| 2010/0153316 | A1 * | 6/2010 | Duffield | H04L 63/1416 706/12 |
| 2011/0214157 | A1 * | 9/2011 | Korsunsky | H04L 63/1441 726/1 |
| 2012/0240185 | A1 * | 9/2012 | Kapoor | H04L 63/20 726/1 |
| 2016/0205123 | A1 * | 7/2016 | Almurayh | H04L 63/1425 726/23 |
| 2016/0261482 | A1 * | 9/2016 | Mixer | H04L 63/00 |
| 2017/0104774 | A1 * | 4/2017 | Vasseur | H04L 63/1425 |
| 2017/0316342 | A1 * | 11/2017 | Franc | G06N 20/10 |
| 2018/0109975 | A1 * | 4/2018 | Kalliola | H04W 28/0289 |
| 2018/0159876 | A1 * | 6/2018 | Park | G06F 16/9024 |
| 2018/0183827 | A1 * | 6/2018 | Zorlular | H04L 63/1416 |
| 2018/0295154 | A1 | 10/2018 | Crabtree et al. | |
| 2019/0007447 | A1 * | 1/2019 | Barnes | H04W 12/68 |

(Continued)

OTHER PUBLICATIONS

"FortiSIEM® Unified Event Correlation and Risk Management for Modern Networks," FORTINET, 2018, https://www.fortinet.com/content/dam/fortinet/assets/data-sheets/FortiSIEM.pdf.

(Continued)

*Primary Examiner* — Badri Narayanan Champakesan
(74) *Attorney, Agent, or Firm* — Kilpatrick Townsend & Stockton LLP (57) ABSTRACT

Anomalies can be identified within a network. For example, a system can automatically detect anomalous network-activity using a machine-learning model that can analyzing how network configurations change over time. The machine-learning model may detect anomalies by comparing current and anticipated rates of change and/or types of topological changes in the network.

17 Claims, 4 Drawing Sheets

(56) References Cited

U.S. PATENT DOCUMENTS

| | | | | |
|---|---|---|---|---|
| 2019/0138938 A1* | 5/2019 | Vasseur | ................ | H04L 41/147 |
| 2019/0260776 A1* | 8/2019 | Zargar | ................ | H04L 41/0813 |
| 2019/0281078 A1* | 9/2019 | Eguiarte Salazar | ... | G06N 20/00 |
| 2019/0349392 A1* | 11/2019 | Wetterwald | ........... | H04J 3/0667 |
| 2020/0022016 A1* | 1/2020 | Fenoglio | ................ | H04L 41/16 |

OTHER PUBLICATIONS

Stewart, B. et al., "A Novel Intrusion Detection Mechanism for SCADA systems which Automatically Adapts to Network Topology Changes," University of Coimbra; De Montfort University; University of Coimbra; Université May 8, 1945—Guelma, Jan. 2017, https://www.researchgate.net/profile/Leandros_Maglaras/publication/312320528_A_Novel_Intrusion_Detection_Mechanism_for_SCADA_systems_that_Automatically_Adapts_to_Changes_in_Network_Topology/links/58f72095aca2723d16a9a817/A-Novel-Intrusion-Detection-Mechanism-for-SCADA-systems-that-Automatically-Adapts-to-Changes-in-Network-Topology.pdf?origin=publication_detail.

* cited by examiner

DETECTING ANOMALIES IN NETWORKS

TECHNICAL FIELD

The present disclosure relates generally to information security and intrusion detection. More specifically, but not by way of limitation, this disclosure relates to detecting anomalies in network environments to mitigate their impact.

BACKGROUND

Software-defined networking (SDN) is an adaptable and easily manageable network architecture that is well suited to support applications requiring high-bandwidth. In SDN architectures, the network control functions are separate from data forwarding functions. This separation allows for directly programmable network control functions and enables abstraction of the network infrastructure for network applications and services. Administrators of SDN Networks can leverage the separation of network control from data forwarding to dynamically adjust traffic flow as service needs change. Instructions are provided by SDN software-based controllers represented as a single logical switch having a global network perspective, instead of multiple, vendor-specific devices and protocols. Further, SDN administrators may configure network controllers using open source SDN programs. The use of these programmable open source software-based controllers simplifies network design and operation.

The quick adaptability and dynamic nature of SDN networks make them well suited to applications including carrier and service providers, cloud computing and data centers, as well as enterprise campuses. For carrier and service providers, SDN enables bandwidth-on-demand, allowing carrier links to request additional bandwidth as needed, such as during peak usage times. For cloud computing and data centers, SDN network virtualization offers better utilization of resources and faster generation of segregated networks. Further, SDN controls may offer quickly adjustable network access control and configurable network monitoring in large-scale or distributed networks environments.

DETAILED DESCRIPTION OF THE INVENTION

Detection of malicious activity (e.g., network intrusion and malware injection) within a network environment typically involves the monitoring network traffic, exchanged files, and applications executing in the network environment. But monitoring malicious activity using typical approaches has become significantly harder with the emergence of software implemented network architectures, due to the rapidly changing and dynamic network topologies associated therewith. Additionally, software implemented networks provide a new opportunity for malicious actors to disrupt network function by injecting programs that modify existing network configurations.

Certain aspects and features of the present disclosure overcome one or more of the abovementioned problems by detecting anomalies within a network based on changes between network configurations. For example, a system of the present disclosure can detect anomalies like rapid or unexpected changes in network configurations. These anomalies can signify malicious activity that other traditional approaches may miss, resulting in more accurate and rapid identification of such activity. Once these anomalies are identified, action can be taken to avoid or counteract the corresponding malicious activity.

For the purposes of providing a clear and concise disclosure, some examples are provided below with reference to software-defined networks (SDN). However, various aspects of the present disclosure can likewise be applied to other types of flexible network architectures, such as cloud computing and virtual network architectures and other network architectures that rely on software implemented virtualization.

In one particular example, a computing device of the present disclosure can include a machine-learning model, such as a neural network, classifier (e.g., Bayesian classifier), or decision tree. The machine-learning model is trained to identify expected or "normal" rates of change in network topology, such as the expected rate at which an SDN controller of a SDN network readjusts network configurations. The machine-learning model may be trained on normal network configuration changes such as network layer interface additions or path modifications, thereby providing an expected rate of change and expected correlations between network components. The machine-learning model can then determine whether any detected changes are anomalous (e.g., sufficiently abnormal to raise suspicion). In this way, the machine-learning model can be used to automatically detect anomalous network activity by analyzing how network configurations change over time.

As discussed above, the machine-learning model can be trained to identify changes between time-related network configurations and classify such changes as being anomalous. The machine-learning model may detect anomalies based on the anticipated rate of change and/or types of topological changes. Examples of changes that can be identified by the machine-learning model can include a change in the frequency of network configuration changes, a change in relationship between configurations of components of an SDN, the nature of a change in network topology, or any combination thereof, such as a change in the frequency that two network-component configurations commonly updated together, occurs.

In certain aspects, the machine-learning model may analyze real-time streams of current network information to identify changes in network topology or configuration. Any identified changes may be compared to expected rates of change and/or expected relationships between network configuration changes to determine whether the change is anomalous. For example, the machine-learning model may analyze a structure of identified configuration changes, as well as the configuration itself in order to identify anomalous behavior. Because anomalous behavior may or may not be due to malicious activity, the machine-learning model may optionally further classify identified anomalies as being benign or malicious.

In some examples, the computing device can generate an indicator (e.g., alert) upon detecting anomalous network activity. The indicator can be provided to a network administrator and may include the time of the anomaly occurrence, the portion of the network in which the anomaly occurred, and any impacted components of the network. In some aspects, the indicator may further include a level of certainty the machine-learning model has in its determination that the identified change is anomalous. An administrator may use the indicator to further assess the identified change and determine an appropriate course of action In some examples, the computing device can automatically perform one or more operations configured to counteract identified malicious activity. For example, the computing device can issue one or more commands for quarantining portions of the SDN that are impacted by anomalies in the network. In one such example, impacted portions of the SDN may be prevented from accepting any further network configuration changes until the quarantine is released by an a network administrator. Additionally or alternatively, impacted portions of the SDN may be reset to their last non-anomalous configuration using log files or reset to a default configuration. Additionally, impacted portions of the network may be both reset and quarantined to prevent recontamination. Such actions may be defined by a network administrator as part of an SDN control policy.

Various aspects of the present disclosure may address the failings of payload-focused anomaly detection techniques by providing an adaptable machine-learning model that can detect changes in network topology. Known intrusion detection techniques focusing on payload analysis require additional information about known attack vectors in order to detect malicious activity. These techniques also require that network traffic be slowed so that payload analysis of packets can be performed. Such techniques are not well suited to the quickly evolving software-implemented networks in which attack vector development may outpace the development of blacklists and whitelists. Further, these techniques would degrade the performance of software-implemented networks to levels that are unsuitable for high-bandwidth applications. Because the machine-learning model can be repeatedly retrained, the machine-learning model can become "smarter" over time to address newer or more sophisticated attacks. And because the machine-learning model does not require actual knowledge of current attack vectors, no external data (e.g., data that is external to the system, such as whitelists or blacklists) is required. Likewise, packet payloads do not require analysis. Instead, the machine-learning model can rely on normal configuration-change behavior of its own network to identify discrepancies and thereby provide anomaly detection that is efficient and evolving.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
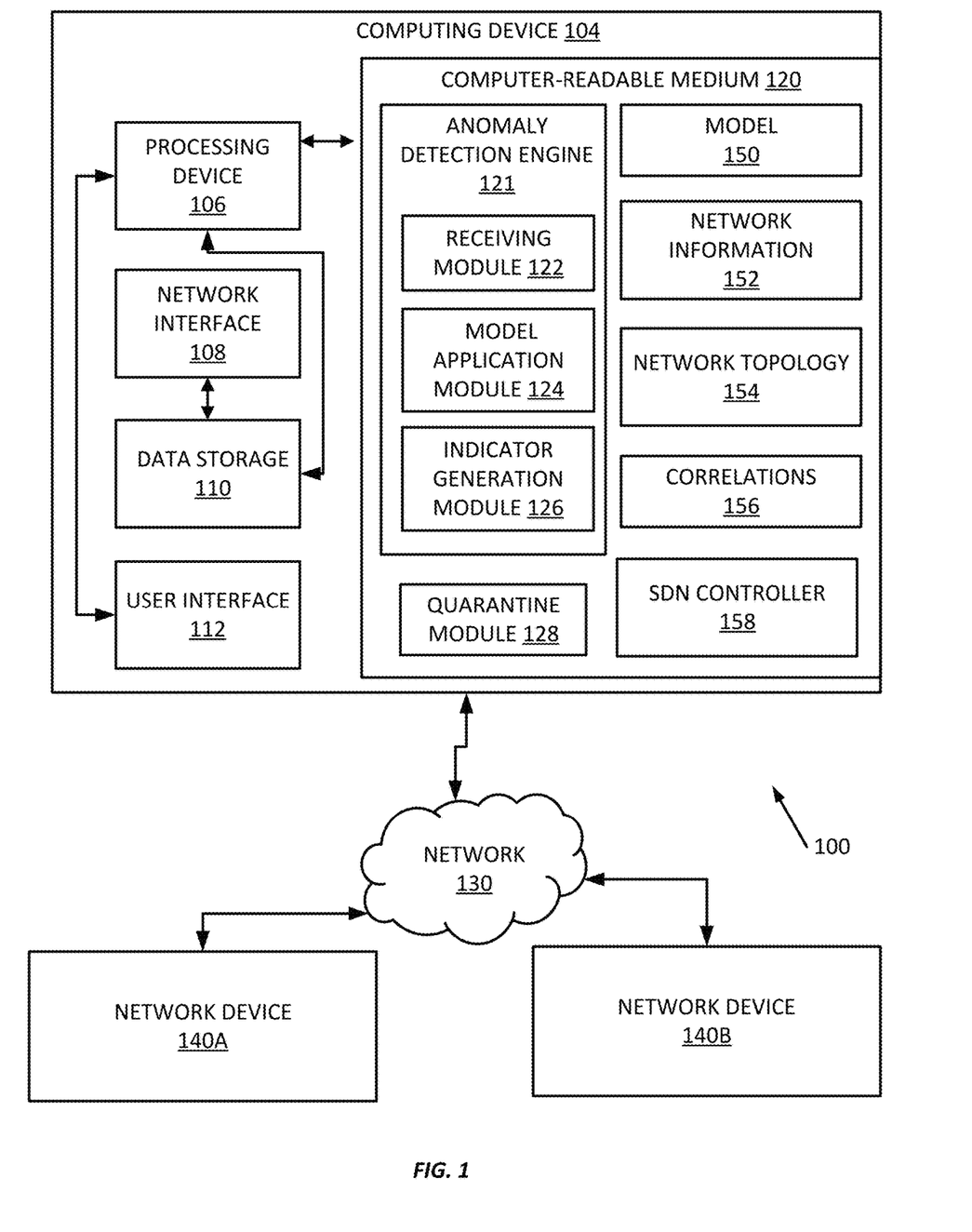
FIG. 1 is a block diagram of an example of a system for detecting anomalies in a network according to some aspects.

FIG. 1 is a block diagram of an example of a system 100 for detecting anomalies in a network 130 according to some aspects. The system 100 includes a computing device 104 in communication with one or more other network devices 140A-B through a network 130 via a network interface 108. Examples of the network devices 140A-B can include routers, switches, or hubs. The network 130 may include any type of network. For example, network 130 may include a local area network, (LAN), a wide area network (WAN), the Internet, or a wireless network, etc.

The computing device 104 includes a non-transitory computer readable medium 120 with software applications and software code, such as an anomaly detection engine 121, software modules 122-126, and an SDN controller 158. Each of these is described in greater detail below. The computing device 104 may be a dedicated device or computer having a combination of computer hardware and software (fixed in capability or programmable) specifically designed for executing a specialized function.

In some examples, the computing device 104 includes an SDN controller 158 that can manage an SDN control stack, such as OpenStack. The SDN controller 158 is a controller for a SDN, of which computing device 104 is a part. The SDN controller 158 in conjunction with the network interface 108 can provide access to network information 152 associated with a configuration of control or forwarding functions, or a configuration of one or more physical or virtual networked computing devices, such as computing device 104 and network devices 140A-B. The SDN controller 158 can include an application program interact (API) and may interface with the network devices 140A-B via network 130. While the SDN controller 158 is depicted in FIG. 1 as part of the computing device 104, the SDN controller 158 may be elsewhere in the system 100 in other examples. The SDN controller 158 is described in greater detail below with reference to FIG. 2.

The computing device 104 further includes an anomaly detection engine 121 having a number of software modules 122-126 for enabling the detection of changes in the configuration of the network 130. A software module may be a self-contained, installable module with computer-executable program code for enabling the anomaly detection engine 121 to interact with other device components and modules. The software modules 122-126 may be produced by various sources, such as different companies or organizations. For example, the software modules 122-126 can be open source and programmed using the same programming language. This may enable a community of developers to quickly and easily create, update, and debug the software modules 122-126, thereby improving the number and quality of the software modules 122-126 available. The software modules 122-126 may be stored in a centralized repository (e.g., GitHub™), from which they can be downloaded (e.g., via the Internet) and installed for use by anomaly detection engine 121.

In some examples, the anomaly detection engine 121 includes a receiving module 122. The receiving module 122 may receive network information 152 from multiple sources. These sources may include the control stack managed by SDN controller 158 and interfaces with one or more virtual or physical network devices, such as network devices 140A-B. The network information 152 may be a continuous or regular stream of data including configuration information (e.g., configuration files) for the SDN network at a current time-step. Network information 152 can illustrate the overall configuration of the network and, in some examples, may be a set of configuration files. The configuration files of the network information 152 may define a physical layer and its components (e.g., network cards/switches), a control layer (e.g., OpenStack configuration), and a virtual layer (e.g., OpenShift or Kubernetes).

The receiving module 122 can also receive a network topology 154 and correlations 156. The network topology 154 can include an expected configuration and statistics, such as a rate at which network configurations are expected to change or update. This may be a frequency of expected network-topology change. The correlations 156 may be a set of relationships between the configurations of two or more SDN components. Relationships may be within a single layer of the SDN or across layers. Correlations may also have a time component, such as a frequency at which configuration relationships are updated. In some aspects, the network topology 154 and the correlations 156 may be stored in a memory as expected values that are passed as input to a machine-learning model 150. In other aspects, the network topology 154 and correlations 156 may be expected rates of change and relationships incorporated as part of the machine-learning model 150.

In some aspects, the receiving module may parse the network information 152, to build one or more configuration-change behavior structures in preparation for analysis by the machine-learning model 150. In another aspect, a model application module 124 may parse and prepare the network information 152 into the configuration-change behavior structure.

The anomaly detection engine 121 includes a model application module 124 that applies the machine-learning model 150 to the received network information 152 in the configuration-change behavior structure to identify changes occurring between two or more configurations of the network 130. For example, the machine-learning model 150 may be applied to the one or more configuration-change behavior structures to identify changes such as new network interfaces, subnets, or pathways between virtual network components.

Changes in network configurations identified by the machine-learning model 150 can be included in an updated configuration-change behavior structure. The changes in the updated configuration-change behavior structure may be compared to the expected changes expressed in the network topology 154 and/or the correlations 156 to determine whether the observed changes deviate from expected events. For example, a change may be classified as anomalous if it has occurred before a time when the change is expected to occur. Similarly, the change may be anomalous if it does not occur in conjunction with a correlated different change. For example, if the number of available IP addresses is modified, but does not accompany an expected change in the number of subnets, then the addition of IP addresses may be classified as anomalous. In addition to providing an anomaly classification (e.g., 0 or 1) for each identified change in the updated configuration-change behavior structure, the machine-learning model 150 can also calculate or otherwise determine a level of certainty associated with the classification. Network configuration changes that are new to the machine-learning model may have a lesser degree of certainty associated with their classification. A percentage (e.g., 94.3%) may be assigned to indicate the level of certainty associated with the classification of a change.

The model application module 124 may collect and store additional information about changes that are classified as anomalous. This information may include a location within the network 130 where the anomaly is occurring. Examples of the location can be a layer in a SDN, such as at the physical layer, at the control layer, or the virtual layer (e.g., application layer). The collected information may also include the nature of the anomaly and any impacted network components. For example, the model application module 124 may determine that the anomaly is the rate of configuration changes in an IP address pool.

In certain aspects, model application module 124 may also apply the machine-learning model to classify the anomalous changes as being malicious or benign. Malicious anomalies may include those having changes that are very different from the expected change value. That is, an acceptable range of variation may be permitted for certain types of network topology changes. These changes can be classified as anomalous because they do not match the expected change, but may not be so divergent from the expected value so as to indicate malicious activity. Such classifications are dependent on the nature of the changes. For some types of network topology changes, the mere existence of any change at all may be an indicator of malicious activity.

The anomaly detection engine 121 further includes an indicator generation module 126 that uses the collected information for anomalous changes to generate an indicator. The indicator may include the time of the anomaly occurrence, the certainty level or percentage associated with the classification of the change as anomalous, where the anomaly occurred within the network 130, and any network components impacted by the anomaly. This indicator may be displayed at computing device 104 or may be transmitted to an administrator's computing device. Information provided in the indicator may enable an administrator to review the anomalous occurrence and consider intervening actions.

In some aspects, the computing device 104 can include a quarantine module 128 that can quarantine a portion of the network 130 associated with or impacted by the anomalous change. In an example in which the network 130 is an SDN network, the quarantine module 128 can interface with the SDN controller 158 to prevent further configuration changes to the portion of the network associated with the anomaly. Additionally or alternatively to quarantining the impacted portion of the SDN network, the quarantine module 128 may reset the impacted portion to a previous configuration or a default configuration. Stored configuration files or snapshots may be used to reset the configuration of the impacted portion. Quarantine may occur before or after the configuration reset.

The machine-learning model 150 can include one or more machine-learning models. In one example, the machine-learning model 150 is an ensemble of N machine-learning models acting in concert to identify and classify changes in network topology. In some aspects, the ensemble may include similar or different types of machine-learning models. Examples of machine-learning models can include decision trees, decision stumps, neural networks, spanning trees, support vector machines, and the like. In a specific example, the ensemble can include a neural network for identifying anomalies and a support vector machine for classifying whether the anomaly is malicious or benign.

The machine-learning model 150 may be trained in a controlled environment under normal network conditions. Training data may be captured prior to training and throughout the training process. Once the machine-learning model 150 has been trained and deployed, it may use the received network information as new training data. In this manner, the machine-learning model is periodically (e.g., continuously) retrained and updated. This feature enables the machine-learning model to adapt to rapidly changing network-topologies of networks.

The components shown in FIG. 1 are exemplary, and other examples can include more components, fewer components, different components, or a different configuration of the components shown in FIG. 1. For instance, other examples may involve the anomaly detection engine 121 having fewer total software-modules with the combined functionality of two or more of the software modules discussed above.

Figure 2:
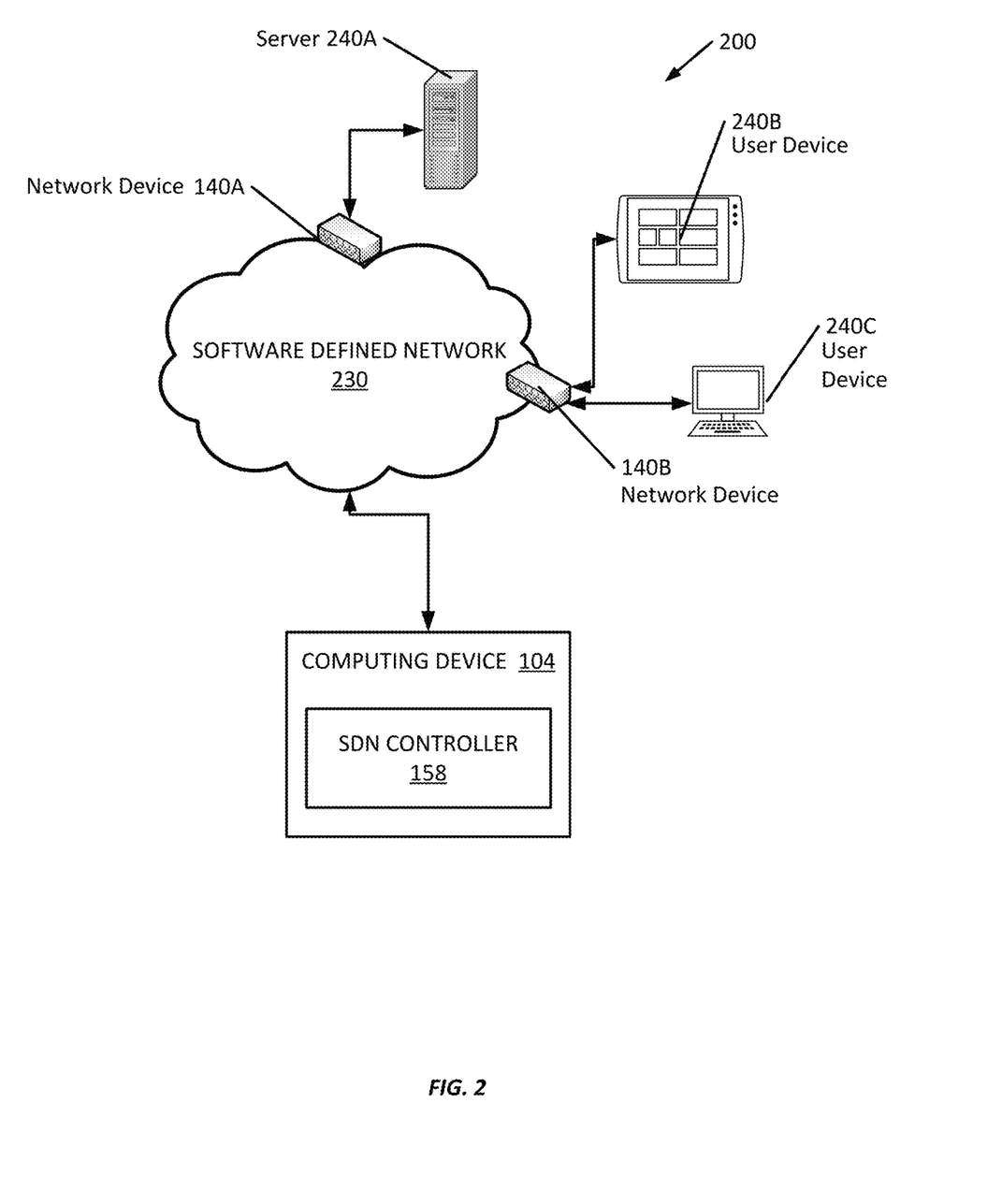
FIG. 2 is a block diagram of an example of a system for a software-defined network suitable for use in detecting anomalies in a network according to some aspects.

FIG. 2 is a block diagram of an example of a system 200 for detecting anomalies in an SDN network 230 according to some aspects. The system 200 includes a computing device 104 hosting an SDN controller 158 managing the SDN network 230, which has a number of network devices 140A-B, both physical and virtual.

Network devices 140A-B are SDN components such as switches, routers, load balancers, multi-tenant capable devices, and the like. These network devices 140A-B can be physical or virtual instantiations. Some or all of the network devices 140A-B can be programmed to forward network traffic.

The SDN controller 158 can be used by an SDN administrator to control or program the network devices 140A-B. The SDN network 230 is configured and managed by the SDN controller 158 may connect and provide services to a number of servers 240A and user devices 240B-C. For example, the SDN controller 158 may program network device 140B to direct traffic to and from user device 240B; and network device 140B to direct traffic to and from server 240A. Other devices, not shown, may include firewalls, intrusion prevention systems, web servers, web-proxies, mail-proxies, DNS servers, and the like. These devices can be physical devices, multi-tenant devices, or virtual services. Although these devices are illustrated as individual devices, they may be multi-purpose devices of the same logical unit.

In some aspects, the SDN controller 158 configures the SDN network 230 to logically represent an existing physical or virtual topology in a network, such that the logical topology can be manipulated with corresponding physical impact on data flows. Further, the SDN controller 158 can be used in combination with a switching platform into which existing physical devices are plugged, and a software control platform that is able to virtually map and control the logical flows running through the switch. In some aspects, the switching platform may be powered by ASICs or other specialized hardware and provide traffic flow control functionality. Alternatively, the switching platform can be software-based and support by hardware for executing the software (e.g., computer-readable media for storing instructions and one or more processing devices for executing the instructions).

The SDN network 230 may be logically organized into three or more layers. The physical layer may represent physical or virtual versions of network assets that enable data flows. A control layer is logically stacked on top of the physical layer and may be responsible for network control and flow forwarding functions. One or more virtual layers (i.e., an application layer) are logically stacked on top of the control layer and provide network functionality.

The SDN network 230 has a virtual layer that includes a number of SDN applications. SDN applications are programs that programmatically communicate their network requirements and behavior to the SDN Controller 158 via a northbound interface (NBI), which is an interface between SDN applications and the SDN Controller 158. Each NBI provides abstract network views and direct communication of network behavior and requirements. The SDN controller 158 can thus provide an abstracted view of the network topology to the SDN applications for their internal decision-making purposes. Each SDN application of the virtual layer has one SDN application logic and one or more NBI drivers. SDN applications can provide a logical path to another layer of abstracted network control such as a higher virtual layer, thus offering one or more higher-level NBIs.

The SDN controller 158 includes SDN control logic, one or more NBI agents, and the control to data-plane interface (CDPI) driver, which enables communication between the control layer and the physical layer. Further, the SDN network 230 has a control layer in which the SDN controller 158 receives network information and manages SDN control and flow forwarding. The SDN controller 158 can translate network requirements from SDN applications of the virtual layer down to the datapaths of the physical layer. The SDN controller 158 can also provide the SDN applications with an abstract view of the network topology. This abstracted view may serve as the network topology 154 in FIG. 1 and may include statistics, such as frequency of changes and event occurrences. Although the SDN controller 158 may be hosted by any computing device within the network, it can be desirable to place the SDN controller in a location within the network that reduces propagation delay, and has strong fault tolerance.

In some aspects, there may be multiple SDN controllers, which may perform the operations described herein in parallel or at staggered time intervals. The control layer of the SDN network 230 can have a centralized, hierarchical, or decentralized design. The various aspects described herein reference a centralized SDN controller 158 hosted on a single computing device 104. However, other configurations of SDN controllers may be implemented to perform the disclosed operations for detecting anomalies in a network. In hierarchical control-layer implementations, distributed SDN controllers operate on a partitioned network view, while decisions that require network-wide knowledge are taken by a logically centralized root controller. Similarly, in distributed control-layer implementations, SDN controllers operate on their local view or they may exchange synchronization messages to exchange information about detected anomalies. Distributed solutions may be well suited to supporting adaptive SDN applications or large-scale networks.

In certain aspects, the physical layer may include a number of SDN datapaths. The control layer can communicate with the physical layer datapaths via the CDPI. A CDPI can provide programmatic control of all forwarding operations, statistics reporting, and event notification. Some of the network information 152 may be collected by the CDPI and provided in a data-stream to the control layer. Each SDN datapath is a logical network device that provides control over flow forwarding and data processing functionality. The logical representation may encompass all or a subset of the physical substrate resources of the system 200 such as server 240A or network device 140B. A SDN datapath includes CDPI agent and a set of one or more traffic forwarding engines and optional traffic processing functions. One or more SDN datapaths may be contained in a physical network element and can be managed as a unit. Conversely, a single SDN datapath can be defined across multiple physical network elements. For example, server 240A and network device 140A can be associated with a single SDN datapath.

Changes to a component of one layer of the SDN network 230 may be communicated or propagated to other layers via various interfaces. As network assets are added or removed from the SDN network 230, new layer interfaces and datapaths will be created, and old ones removed. These changes may be analyzed by a machine-learning model 150 to detect whether the change is anomalous. For example, the unexpected generation of unexpected interfaces between an SDN application and the SDN controller 158 may be anomalous. If the machine-learning model 150 determines that this change is both anomalous and malicious, the interface may be quarantined to prevent the flow of network requests between the SDN application and the SDN controller 159.

Figure 3:
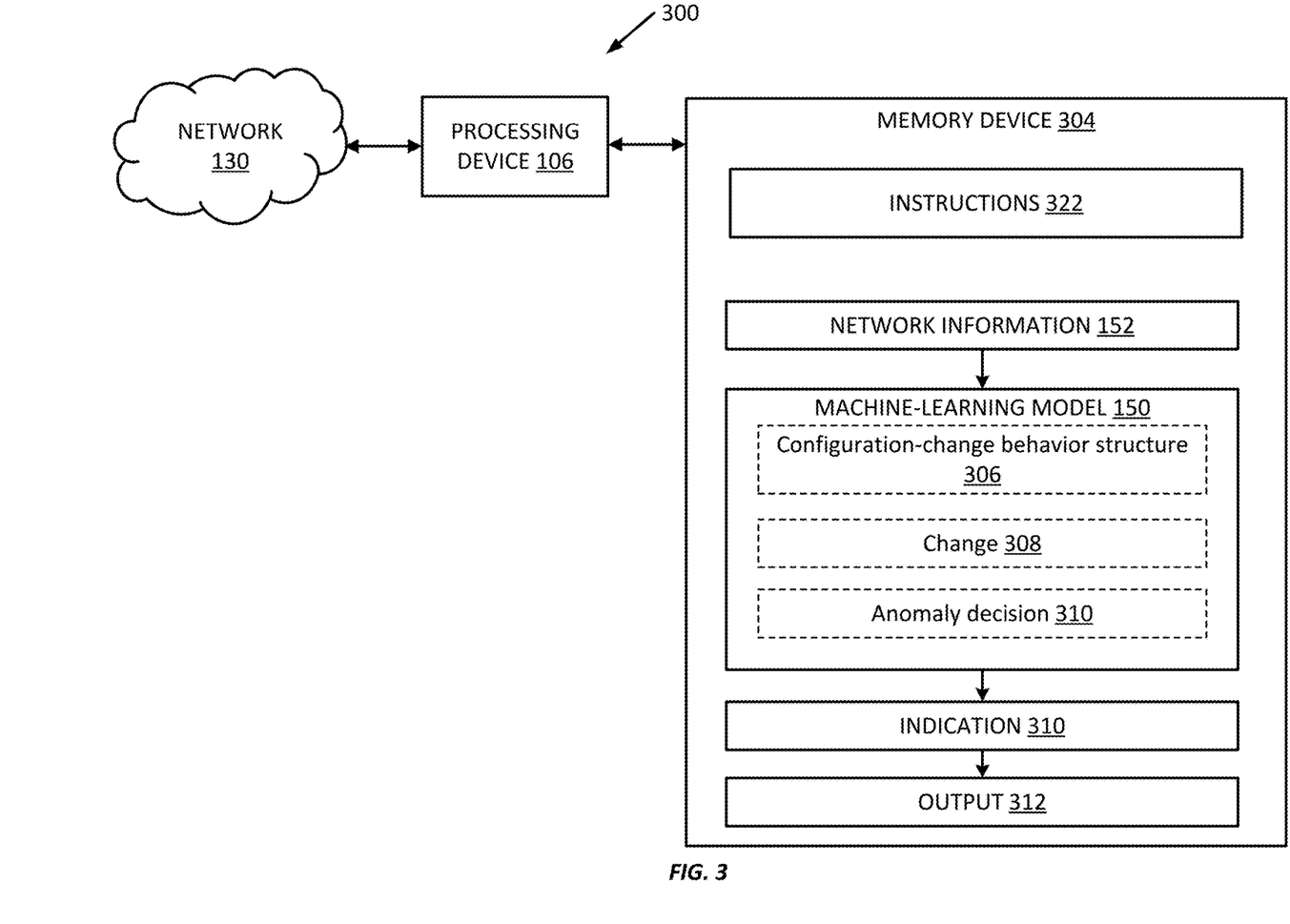
FIG. 3 is a block diagram of another example of a system for detecting anomalies in a network according to some aspects.

FIG. 3 is a block diagram of another example of a system 300 for detecting anomalies in a network 130 according to some aspects. The components shown in FIG. 3 are exemplary, and other examples can include more components, fewer components, different components, or a different configuration of the components shown in FIG. 3.

The system 300 includes a processing device 106 communicatively coupled with a memory device 304. In some examples, the processing device 106 and the memory device 304 can be part of a computing device, such as computing devices 104. The processing device 106 can include one processing device or multiple processing devices. Non-limiting examples of the processing device 106 include a Field-Programmable Gate Array (FPGA), an application-specific integrated circuit (ASIC), a microprocessor, etc. The processing device 106 can execute instructions 322 stored in the memory device 304 to perform operations. In some examples, the instructions 322 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 306 can read instructions 322. A computer-readable medium can include electronic, optical, magnetic, or other storage devices capable of providing the processing device 306 with computer-readable instructions 322 or other program code. Non-limiting examples of a computer-readable medium include magnetic disk(s), memory chip(s), ROM, random-access memory (RAM), an ASIC, a configured processing device, optical storage, or any other medium from which a computer processing device can read the instructions 322.

In some examples, the processing device 106 can detect an anomaly within a network 130 by applying a machine-learning model 150 to network information 152 describing current network configurations. The machine-learning model 150 can receive the network information 152 and generate a configuration-change behavior structure 306 based on the network information 152. A configuration-change behavior structure 306 can be a vector, matrix, list, or other data structure indicating (e.g., containing, describing, or quantifying) one or more network-configuration versions for one or more network components. Next, the machine-learning model 150 can determine a determine a change 308 between at least two of the network configurations in the configuration-change behavior structure 306, and determine whether an anomaly occurred in the network 130 based on the change 308. The machine-learning model 150 can then output an indication 310 of whether or not an anomaly occurred in the network 130. The processing device 106 can receive the indication 310 and responsively generate an output 312 (e.g., to an administrator of the network 130). The output 312 can indicate that one or more of the network configuration changes included in the configuration-change behavior structure 306 are anomalous.

In some examples, the processing device 106 can additionally or alternatively take autonomous action to address the identified anomaly. For example, a portion of a network layer, controller function, SDN program, or underlying infrastructure associated with the identified change may be quarantined or prevented from making additional changes (e.g., by quarantine module 127 of FIG. 1).

Figure 4:
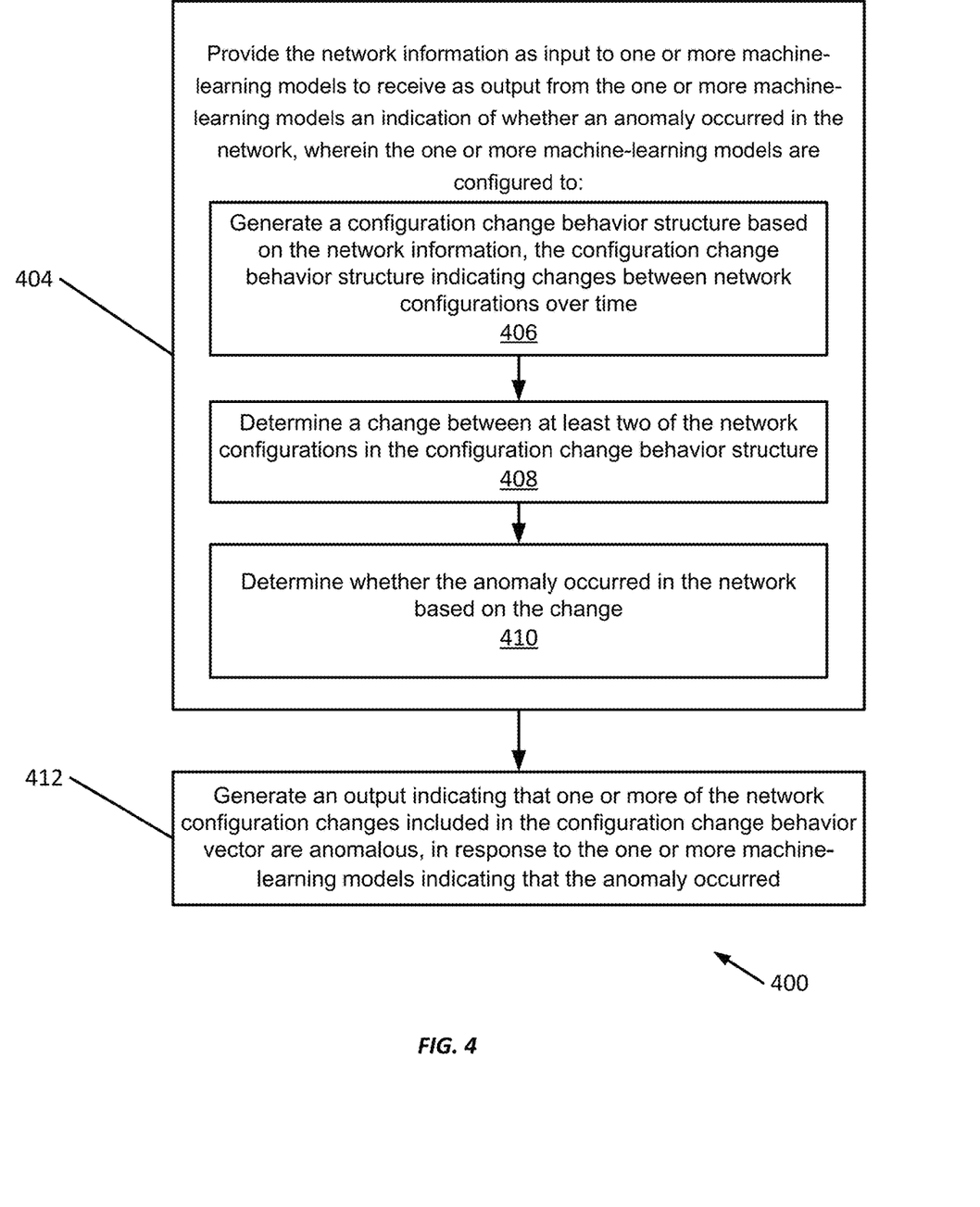
FIG. 4 is a flow diagram of another example of a process for detecting anomalies in a network according to some aspects.

FIG. 4 is a flow chart of an example of a process 400 for detecting anomalies in a network according to some aspects. Other examples can include more steps, fewer steps, different steps, or a different order of the steps than is shown in FIG. 4. The steps of FIG. 4 are discussed below with reference to the components discussed above in relation to FIG. 1.

In block 404 of process 400, the processing device 106 can provide network information as input to one or more machine-learning models to receive as output from the one or more machine-learning models an indication of whether an anomaly occurred in the network. More specifically, the processing device 106 can instruct the model application module 124 of the anomaly detection engine 121 to apply the machine-learning model 150 to the network information 152. The SDN controller 158 may receive network information from NBIs of the virtual layer and CDPIs of the physical layer. This network information may be provided to the receiving module 122. In some aspects, additional network information in the form of network topology 154 and correlations 156 may be provided to the receiving module 122. This information may indicate expected network topology, statistics, such as rates of change of network components, and relationships between network components. The network information may be provided as input to the machine-learning model 150.

The application of the machine-learning model 150 to the input of the network information 152 may include the processing device 106 instructing the model application module 124 to performing several operations. In block 406 of process 400, the processing device 106 can generate a configuration-change behavior structure based on the network information, the configuration-change behavior structure indicating changes between network configurations over time. More specifically, the processing device may instruct the model application module 124 of the anomaly detection engine 121 to insert network configurations provided in the network information into a configuration-change behavior structure. The configuration-change behavior structure thus contains many versions of configurations as sampled over a current time step. The size of the time step may be defined by an SDN administrator.

In block 408 of process 400, the processing device 106 can determine a change between at least two of the network configurations in the configuration-change behavior structure. More specifically, the processing device 106 can instruct the model application module 124 of the anomaly detection engine 121 to compare like or similar network configurations within the configuration-change behavior structure to determine whether or not a change in configuration has occurred between two configurations. For example, if two network configurations indicate the presence of a different number of IP addresses in an IP address pool or the deletion of network interfaces, a change is detected. Changes may be small or significant. All identified changes may be placed in an updated configuration-change behavior structure in preparation for classification.

In block 410 of process 400, the processing device 106 can determine whether the anomaly occurred in the network based on the change. More specifically, the processing device 106 can instruct the model application module 124 of anomaly detection engine 121 to compare the determined changes, e.g., the contents of the updated configuration-change behavior structure, to expected network to ploy and/or correlations information in order to determine whether the behavior is anomalous. The network topology information may include an expected or default network configuration along with network statistics, such as a frequency of change or rate of change of network configurations. If the determined changes occur outside of the expected frequency, then the changes are anomalous. Similarly, the correlations may indicate configuration changes that typically occur together, in parallel, or within a set time period of one another. If these events do not occur as expected, an associated change is anomalous. In some aspects the expected value may be a threshold to which the change is compared. IF the change meets the predefined threshold then the behavior is anomalous.

In block 412 of process 400, the processing device 106 can generate an output indicating that one or more of the network configuration changes included in the configuration-change behavior structure are anomalous, in response to the one or more machine-learning models indicating that the anomaly occurred. More specifically, the processing device 106 can instruct the indicator generation module 126 of the anomaly detection engine 121 to generate an alert that may be displayed or transmitted to an SDN administrator. The alert may provide information about the machine-learning model's level of cherty that the change is anomalous, the location within the SDN network in which the change occurred, the time of the change, and any impacted network components.

In some aspects, the processing device 106 may instruct a quarantine module 128 to reset the configuration of network components impacted by the anomalous change and/or quarantine the impacted portions to prevent further configuration changes until approved by the SDN administrator.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
    a processing device; and
    a memory device including instructions that are executable by the processing device for causing the processing device to:
        receive network information relating to a network that includes a plurality of network devices, the network information indicating a rate at which topological configurations of the plurality of network devices changed over a timespan;
        provide the network information as input to one or more machine-learning models to receive as output from the one or more machine-learning models an indication of whether an anomaly occurred in the network, wherein the one or more machine-learning models are configured to determine whether the anomaly occurred in the network based on the rate at which the topological configurations of the plurality of network devices changed over the timespan by:
            determining a rate of change between the topological configurations;
            comparing the rate of change to a predefined threshold; and
            determining that the anomaly occurred in the network in response to the rate of change meeting the predefined threshold;
        receive an indication from the one or more machine-learning models that the anomaly occurred in the network; and
        in response to receiving the indication, execute one or more operations configured to assist in counteracting the anomaly.

2. The system of claim 1, wherein the one or more machine-learning models are further configured to determine that the anomaly occurred in the network in response to detecting a change in a correlation between at least two network devices among the plurality of network devices.

3. The system of claim 1, wherein the one or more machine-learning models are further configured to output the machine-learning model's level of certainty that the anomaly occurred in the network.

4. The system of claim 1, wherein the memory device further includes instructions that are executable by the processing device for causing the processing device to generate an output that identifies which network configuration change in a set of network configuration changes is anomalous.

5. The system of claim 1, wherein the memory device further comprises instructions executable by the processing device for causing the processing device to modify a network parameter based on the indication from the one or more machine-learning models to counteract the anomaly.

6. A method comprising:
    receiving, by a processor device, network information relating to a network that includes a plurality of network devices, the network information indicating a rate at which topological configurations of the plurality of network devices changed over a timespan;
    providing, by the processing device, the network information as input to one or more machine-learning models to receive as output from the one or more machine-learning models an indication of whether an anomaly occurred in the network, wherein the one or more machine-learning models are configured to determine whether the anomaly occurred in the network based on the rate at which the topological configurations of the plurality of network devices changed over the timespan by:
        determining a rate of change between the topological configurations;
        comparing the rate of change to a predefined threshold; and
        determining that the anomaly occurred in the network in response to the rate of change meeting the predefined threshold;
    receiving, by the processing device, an indication from the one or more machine-learning models that the anomaly occurred in the network; and
    in response to receiving the indication, executing, by the processing device, one or more operations configured to assist in counteracting the anomaly.

7. The method of claim 6, wherein the one or more machine-learning models are further configured to determine that the anomaly occurred in the network in response to detecting a change in a correlation between at least two network devices among the plurality of network devices.

8. The method of claim 6, wherein the one or more machine-learning models are further configured to output the machine-learning model's level of certainty that the anomaly occurred in the network.

9. The method of claim 6, further comprising generating an output that identifies which network configuration change in a set of network configuration changes is anomalous.

10. The method of claim 6, further comprising modifying, by the processing device, a network parameter based on the indication from the one or more machine-learning models to counteract the anomaly.

11. A non-transitory computer readable medium including instructions that are executable by a processing device for causing the processing device to:
   receive network information relating to a network that includes a plurality of network devices, the network information indicating a rate at which topological configurations of the plurality of network devices changed over a timespan;
   provide the network information as input to one or more machine-learning models to receive as output from the one or more machine-learning models an indication of whether an anomaly occurred in the network, wherein the one or more machine-learning models are configured to determine whether the anomaly occurred in the network based on the rate at which the topological configurations of the plurality of network devices changed over the timespan by:
   determining a rate of change between the topological configurations;
   comparing the rate of change to a predefined threshold; and
   determining that the anomaly occurred in the network in response to the rate of change meeting the predefined threshold;
   receive an indication from the one or more machine-learning models that the anomaly occurred in the network; and
   in response to receiving the indication, execute one or more operations configured to assist in counteracting the anomaly.

12. The non-transitory computer readable medium of claim 11, wherein the one or more machine-learning models are further configured to determine that the anomaly occurred in the network in response to detecting a change in a correlation between at least two network devices among the plurality of network devices.

13. The non-transitory computer readable medium of claim 11, wherein the one or more machine-learning models are further configured to output the machine-learning model's level of certainty that the anomaly occurred in the network.

14. The system of claim 1, wherein the one or more machine-learning models are configured to determine that the anomaly occurred in the network based on a configuration change in the network, the configuration change including at least one change to a subnet, a pathway, or a network interface associated with the network.

15. The system of claim 1, wherein the memory device further includes instructions that are executable by the processing device for causing the processing device to receive the network information from a software controller configured to control a topology of the network by interfacing with the plurality of network devices.

16. The system of claim 15, wherein:
   the software controller is a software-defined network (SDN) controller of a software-defined networking system; and
   the software-defined networking system includes a physical layer and a control layer, the physical layer including the plurality of network devices, and the control layer including the SDN controller.

17. The system of claim 1, wherein the one or more operations are configured to output a notification to a user of the anomaly.

* * * * *